United States Patent
Barnes et al.

(10) Patent No.: US 10,146,918 B2
(45) Date of Patent: **\*Dec. 4, 2018**

(54) DIGITAL RIGHTS MANAGEMENT FOR HTTP-BASED MEDIA STREAMING

(71) Applicant: MobiTV, Inc., Emeryville, CA (US)

(72) Inventors: Fritz Barnes, Alameda, CA (US); Torbjorn Einarsson, Stockholm (SE); Do Hyun Chung, San Ramon, CA (US); Ken Klinner, Lafayette, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,955

(22) Filed: Nov. 28, 2017

(65) Prior Publication Data

US 2018/0089400 A1    Mar. 29, 2018

Related U.S. Application Data

(63) Continuation of application No. 13/752,533, filed on Jan. 29, 2013, now Pat. No. 9,892,239.

(51) Int. Cl.
*G06F 21/10* (2013.01)
*H04L 29/06* (2006.01)

(52) U.S. Cl.
CPC .......... *G06F 21/10* (2013.01); *H04L 63/0428* (2013.01); *H04L 63/062* (2013.01); *G06F 2221/0759* (2013.01); *H04L 2463/101* (2013.01)

(58) Field of Classification Search
None
See application file for complete search history.

(56) References Cited

U.S. PATENT DOCUMENTS

| | | | |
|---|---|---|---|
| 2008/0098481 A1 | 4/2008 | Lee et al. | |
| 2010/0199105 A1* | 8/2010 | Lee | G06F 21/10 713/189 |
| 2012/0284802 A1* | 11/2012 | Hierro | G06F 21/10 726/27 |

(Continued)

OTHER PUBLICATIONS

"U.S. Appl. No. 13/752,533, Examiner Interview Summary dated Jul. 24, 2017", 3 pages.

(Continued)

*Primary Examiner* — Henry Tsang
(74) *Attorney, Agent, or Firm* — Kwan & Olynick LLP (57) ABSTRACT

Techniques and mechanisms described herein facilitate the management of digital rights for media content item presentation. According to various embodiments, a request for a content decryption key may be received at a media application implemented at a computing device. The request may be transmitted by a media content player implemented at the computing device. The request may be transmitted in accordance with a designated key exchange protocol. A license for an encrypted media content item corresponding with the requested content decryption key may be identified at the media application. Based on information included in the license, encrypted key material may be decrypted to create the requested content decryption key via a processor at the computing device. The requested content decryption key may be provided to the media content player.

20 Claims, 8 Drawing Sheets

(56) References Cited

U.S. PATENT DOCUMENTS

2013/0174271 A1* 7/2013 Handal ............ G06F 17/30017
726/27
2014/0215214 A1 7/2014 Barnes et al.

OTHER PUBLICATIONS

"U.S. Appl. No. 13/752,533, Final Office Action dated Mar. 19, 2015", 11 pgs.

"U.S. Appl. No. 13/752,533, Final Office Action dated Apr. 28, 2016", 14 pages.

"U.S. Appl. No. 13/752,533, Non Final Office Action dated Jan. 29, 2016", 13 pgs.

"U.S. Appl. No. 13/752,533, Non Final Office Action dated Apr. 20, 2017", 23 pages.

"U.S. Appl. No. 13/752,533, Non Final Office Action dated Oct. 23, 2014", 11 pgs.

"HTTP Adaptive Streaming: Using Edgeware Video Delivery Appliances", Whitepaper/Edgeware AB 2010, Version1.8-A4-Oct. 2010, Retrieved from Internet <http://www.screenplaysmag.com/wp-content/uploads/2012/05/Edgewarewp4.pdf>, Oct. 2010, 13 pgs.

Gueron, Shay, "Advanced Encryption Standard (AES) Instructions Set", Whitepaper: Intel Mobility Group Israel Development Center, Israel, Retrieved from Internet <http://software.intel.com/sites/default/files/m/6/1/9/d/6/17973-aes-instructions-set_wp.pdf>, Jul. 2008, 35 pgs.

Gueron, Shay, "Intel's Advanced_Encryption Standard (AES) Instructions Set", Whitepaper/Intel Mobility Group, Israel Development Center, Israel, Rev 2.0, Retrieved from Internet <http://software.intel.com/sites/default/files/m/6/5/5/4/7/20457-Advanced_Encryption_Standard_28AES_29_Instructions_Set_Rev_2_2801_29.pdf>, Apr. 2009, 58 pgs.

Pantos, R., "HTTP Live Streaming: draft-pantos-http-live-streaming-08", [Online]. Retrieved from the Internet: < http://tools.ietf.org/pdf/draft-pantos-http-live-streaming-08.pdf >, Accessed on Jul. 17, 2012, Mar. 1, 2012 00:00:00.0.

* cited by examiner

DIGITAL RIGHTS MANAGEMENT FOR HTTP-BASED MEDIA STREAMING

CROSS-REFERENCE TO RELATED APPLICATIONS

This application is a continuation of and claims priority to U.S. patent application Ser. No. 13/752,533 "DIGITAL RIGHTS MANAGEMENT FOR HTTP-BASED MEDIA STREAMING," by Barnes et al., which is incorporated by reference herein in its entirety and for all purposes.

TECHNICAL FIELD

The present disclosure relates to digital rights management techniques for media content streaming protocols.

DESCRIPTION OF RELATED ART

Content streaming protocols such as HTTP Live Streaming (HLS) allow the delivery of streaming content such as video to computing devices. Streaming content may be delivered from any of various sources and using any of various delivery techniques. For example, streaming content may be transmitted to a client computer from a content server via a network such as the Internet. As another example, streaming content may be transmitted to a cable box from a content provider via a cable television network.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the delivery of DRM-protected media content to a computing device. In some implementations, the techniques may allow the use of a secure streaming service in conjunction with a native player and/or native protocols supported by a client device. In particular embodiments, techniques described herein may be used to transmit DRM-protected streaming video via the HTTP Live Streaming (HLS) protocol. For instance, the system may employ native APIs to intercept request for keys before an HTTP request may be made. Then, a local client application configured to implement a DRM scheme may provide the request instead. The local client application may receive the encrypted media content and provide the content to the native player.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

According to various embodiments, a content streaming protocol may facilitate the use of encryption to protect a content stream such as a video stream. For instance, the HLS specification includes the use of AES encryption to protect the video stream. However, this protection is limited and not sufficient to provide effective digital rights management (DRM) due to the limited manner in which keys are provided to applications running at client machines.

For instance, AES encryption allows for the rotation of keys through the use of techniques such as inserting the keys either directly in playlists or providing a URI through which the keys can be requested. However, these techniques are insufficient when applied to a broadcast model such as eBMSM, ATSC M/H, or others. In a broadcast model, these techniques would involve transmitting a single key to many different recipients, potentially allowing anyone to access the channels on which the content is presented.

In some conventional authentication schemes, non-native local players and/or DRM systems are used to receive and present media content streams. However, such schemes have various drawbacks from security and usability standpoints. For example, when the media player other than a native player is used for media playback on a mobile device, the battery life of the mobile device and/or the quality of playback may be detrimentally affected. As another example, some schemes employ customized DRM players that use proxying and decryption to provide the data to the player. However, such techniques may introduce additional processing overheads and may hide the network latencies necessary to accurately perform bandwidth adaptation. Also, the decrypted data may be exposed, for instance to a loopback network interface. The decrypted data could then potentially be sniffed and consumed by a malicious attacker. As yet another example, native media players are often implemented at least partially in hardware and/or firmware and thus may enjoy considerable efficiency advantages over non-native players. As still another example, some such schemes involve receiving media encrypted in a first format, decrypting the media using a non-native DRM scheme, and then encrypting the media using a native DRM scheme before providing the media to a native player. However, such schemes introduce considerable computational overhead to the presentation of media content.

In some conventional authentication schemes, keys are provided via key URIs that are used to directly access keys stored on servers external to the client machine. Access to such key URIs may be unauthenticated or may be authenticated via a protocol such as HTTP/S. However, such schemes have various drawbacks from security and usability standpoints. For example, such streams can often be intercepted and replayed or the key URI format guessed by malicious attackers. As another example, even when some form of cookie authentication system is used, the system may not provide the system administrator with sufficient control over how the keys are used. As yet another example, systems that employ such techniques may preclude the presentation of local content such as content stored on a storage device at the client machine. Presentation of local content under these conventional authentication schemes may involve storing the content decryption key or keys on a local storage device located within the client machine. However, such storage would present a security risk since a malicious user at the client machine could gain access to the decryption key from the storage device and use the key to decrypt a copy of the content stored on the local storage device for other purposes.

In some conventional authentication schemes, per-user control over media content access is difficult, costly, or impossible. For instance, encrypting streaming media separately for each user and sending each user a separate key causes the system to incur considerable computing costs. Accordingly, many different users are provided with the same key in many conventional authentication schemes. However, these users then all have access rights to the media content, and revoking the key for one user would involve revoking the key for all users.

According to various embodiments, various techniques described herein facilitate per-user control over media content access. Even if different users are provided with the same key, the use of the key may be controlled separately for different users using a licensing system. The licensing system may allow different users to access the same content using the same key but under different restrictions, rules, and controls.

According to various embodiments, techniques described herein facilitate the use of a native media content player in conjunction with advanced DRM techniques that allow improved control of digital rights. In particular embodiments, the native player and hardware decryption can be used while still maintaining the control of a full featured DRM solution that can provide control features such as limiting the number of times a file is played, controlling the types of networks used, and other such capabilities.

According to various embodiments, HLS AES protection may be used in conjunction with a DRM key delivery stream. The system may support a variety of modes of operation, such as streaming of assets with single key encryption, streaming of assets where encryption keys rotate, and local playback of encrypted content.

According to various embodiments, the system may employ native APIs to intercept request for keys before they are transmitted to an external server. For instance, a client application in an iOS environment may employ iOS APIs to intercept requests for keys before a request can be made. Then, the local client application may handle the request instead, retrieving locally stored information or sending a request to a remote server as necessary. The application may analyze information contained in the URI corresponding with the key request. In particular embodiments, this information need not indicate a specific resource on a server. Instead, this information may include data for use by the DRM agent running in the application to use when analyzing and responding to the request.

In particular embodiments, techniques and mechanisms are described with reference to the HLS specification. However, the techniques and mechanisms described herein are widely applicable to a variety of content streaming protocols and frameworks. Similarly, some techniques and mechanisms are described herein with reference to use with native media content players. However, the techniques and mechanisms described herein are widely applicable to many different media content players.

In particular embodiments, techniques and mechanisms described herein may be used for any streaming format that relies on the transfer of small files or file segments. For instance, the techniques and mechanisms may be applied to any playlist-based streaming format. However, the techniques and mechanisms are generally applicable to a wide range of video content technologies.

Although the content is often referred to herein as video content, the techniques and mechanisms described herein are generally applicable to a wide range of content and content distribution frameworks. For example, the content may be media content such as video, audio, or image content.

The storage capacity, write speed, read speed, and other characteristics described herein are included for the purpose of clarity and to provide examples. Computer hardware, software, and networking characteristics change over time. Nevertheless, the techniques described herein are widely applicable to storage systems and frameworks having various hardware, software, and networking characteristics.

Figure 1:
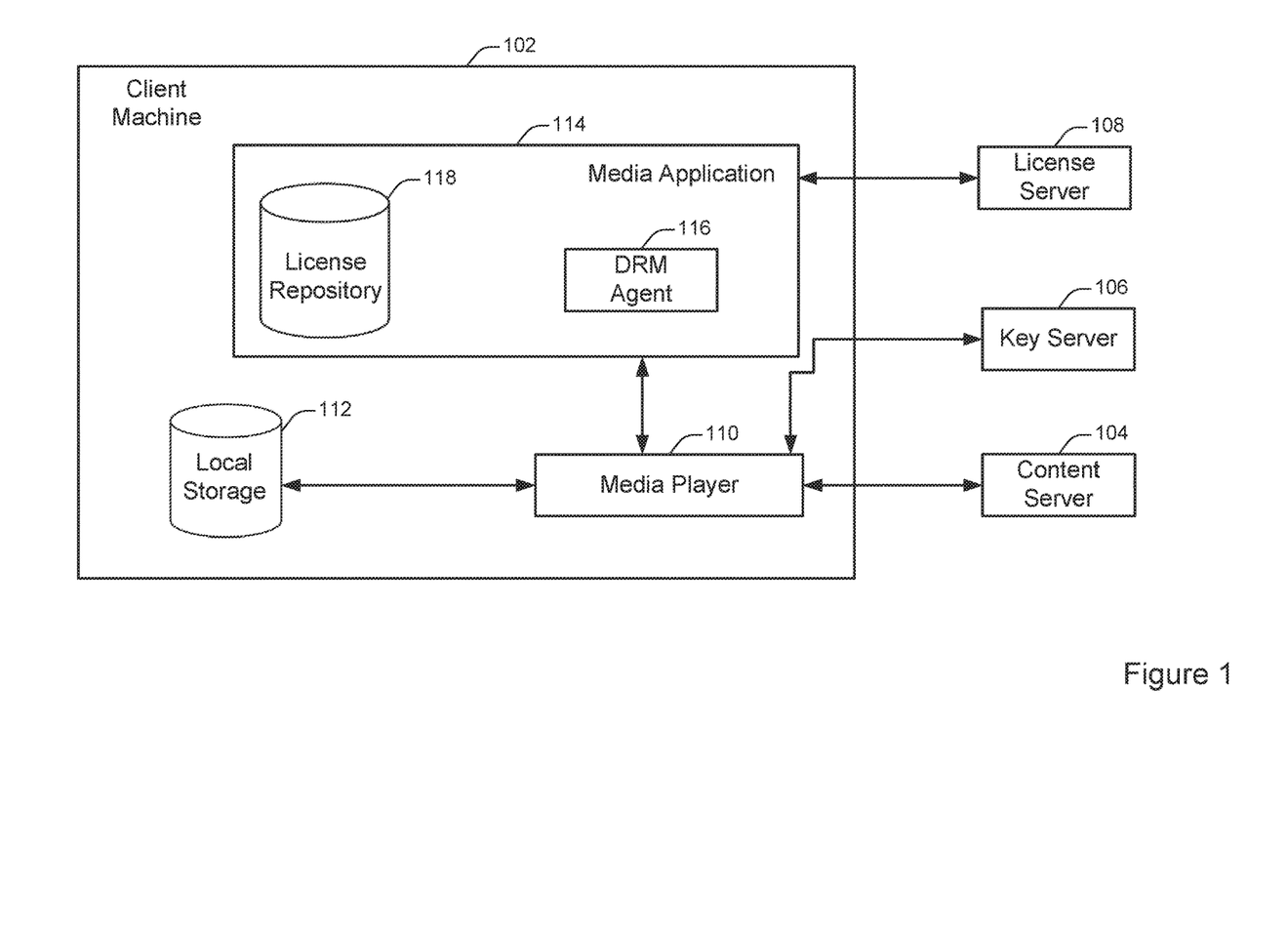
FIG. 1 illustrates one example of a media content streaming system that can be used with various techniques and mechanisms of the present invention.

FIG. 1 illustrates one example of a media content streaming system that can be used with various techniques and mechanisms of the present invention. The system shown in FIG. 1 includes a client machine 102, a content server 104, a key server 106, and a license server 108. The client machine 102 includes a media player 110, a local storage system 112, and a media application 114. The media application includes, or has access to, a DRM agent 116 and a license repository 118.

According to various embodiments, the client machine 102 may be any computing device configured to present streaming or downloaded media content. For instance, the client machine 102 may be a mobile phone, a laptop computer, a desktop computer, a tablet computer, a smart television, or a cable box. In particular embodiments, the client machine 102 may be a mobile phone or tablet computer configured to implement an iOS operating system.

According to various embodiments, the media player 110 is configured to present media content on the client machine or at a video and/or audio presentation device in communication with the client machine. For instance, the media player 110 may receive a request to load a particular file or a request to load a playlist that includes various media-related materials, as is discussed with reference to FIG. 2.

According to various embodiments, the media player 110 may be configured to determine if the requested media content is encrypted. If the content is encrypted, then the media player 110 may be configured to request an appropriate decryption key from the key server 106. In particular embodiments, the media player 110 may be configured to support a limited DRM scheme even in the absence of the media application 114. For instance, the media player 110 may provide native support for the decryption of media content received via a protocol such as AES so long as the media player also receives a decryption key.

According to various embodiments, the key server 106 is configured to provide access to keys for decrypting encrypted content received from the content server 104. For instance, the media player 110 at the client machine may be configured to transmit a request to the key server 106 when a key URI is reached in a media content playlist. The key URI may indicate to the media player 110 that a new key is necessary for decrypting the content included in the media content playlist.

According to various embodiments, the key server 106 may be configured to perform basic authentication of the client machine 102. For instance, the key server 106 may be configured to determine that a user of the client machine 102 is an authenticated user of the media content management system and is authorized to access encrypted content.

According to various embodiments, the content server 104 is configured to provide streaming or downloadable media content such as video upon request. The content server 104 may be configured to send encrypted content, such as video encrypted via the AES encryption standard. The content server 104 may be associated with a content provider such as a cable television broadcaster. Alternately, the content server 104 may be associated with a content distributor that distributes content received from various content providers.

According to various embodiments, the media application 114 is configured to communicate with the media player 110. For instance, when the media player 110 attempts to transmit a key request to the key server 106, the media application 114 may receive and handle this request instead. For instance, the media application 114 may receive a request for a key, request an appropriate license from the license server 108, and use the information included in the license to provide the requested key to the media player 110.

According to various embodiments, the media application 114 may be provided by a media content distributor or service provider. For instance, the media application 114 may be a downloadable application that a user may install on the client machine 102. The media application may in some instances perform various operations apart from DRM-related operations. For instance, the media application may facilitate the browsing of available media content selections or the display of information describing media content items.

According to various embodiments, the license server 108 is configured to communicate with the media application 114 to provide content licenses to the media application 114 upon request. For instance, the DRM agent 116 within the media application 114 may send a request to the license server 108 for a license to play content requested by the media player 110. If the account associated with the client machine 102 has the right to access the requested content, then the license server 108 may send a license to access the requested content to the DRM agent 116 within the media application 114.

According to various embodiments, the license sent by the license server 108 may provide the media application 114 with the ability to provide the media player 110 with a decrypted key. The media player 110 may then use the decrypted key to access the requested media content.

According to various embodiments, the license sent by the license server 108 may impose one or more restrictions or constraints on the presentation on the content. For example, a license may allow unlimited playback for a 24 hour period, after which playback is prohibited. As another example, a license may allow playback for a designated period of time (e.g., 2 days) after playback is first initiated. As yet another example, a license may allow playback only during designated times of day, days of the week, or other restricted time periods.

According to various embodiments, the license server 108 may communicate with the application 114 at least in part via a public key encryption scheme. For instance, the application 114 may maintain a private key while providing its public key to the license server 108. In this way, the license server 108 can provide a license that is specific to the client machine 102 since the media application 114 at the client machine 102 will be the only entity that possesses the private key needed to decrypt the license that is encrypted with the public key.

According to various embodiments, the license repository 118 is capable of storing licenses retrieved by the DRM agent 116 from the license server 108. The license repository 118 may store licenses so that the DRM agent 116 need not communicate with the license server 108 to accommodate every playback request. For instance, the DRM agent 116 may retrieve a license when playback is requested the first them. Then, the DRM agent 116 may store the retrieved license in the license repository 114. When the client machine 102 later receives a new request for playback, the media application 114 can first check whether a license for the requested content is present in the license repository and still valid, and only retrieve a license from the license server 108 if the license repository 118 does not contain a license.

According to various embodiments, the local storage system 112 may be used for various purposes, including but not limited to storing downloaded media content files for later playback. For instance, the client machine 102 may download a movie or television program and store the video file on the local storage 112.

According to various embodiments, the system shown in FIG. 1 may contain more than one of various components shown in FIG. 1. For instance, a client machine may be in communication with potentially many different content servers, key servers, and license servers.

According to various embodiments, the components shown in FIG. 1 are illustrated and described with reference to their functional properties rather than their relation to hardware present on the client machine 102. However, the client machine 102 may include any of a variety of hardware components such one or more memory modules, processors, storage devices, and communications interfaces.

Figure 2:
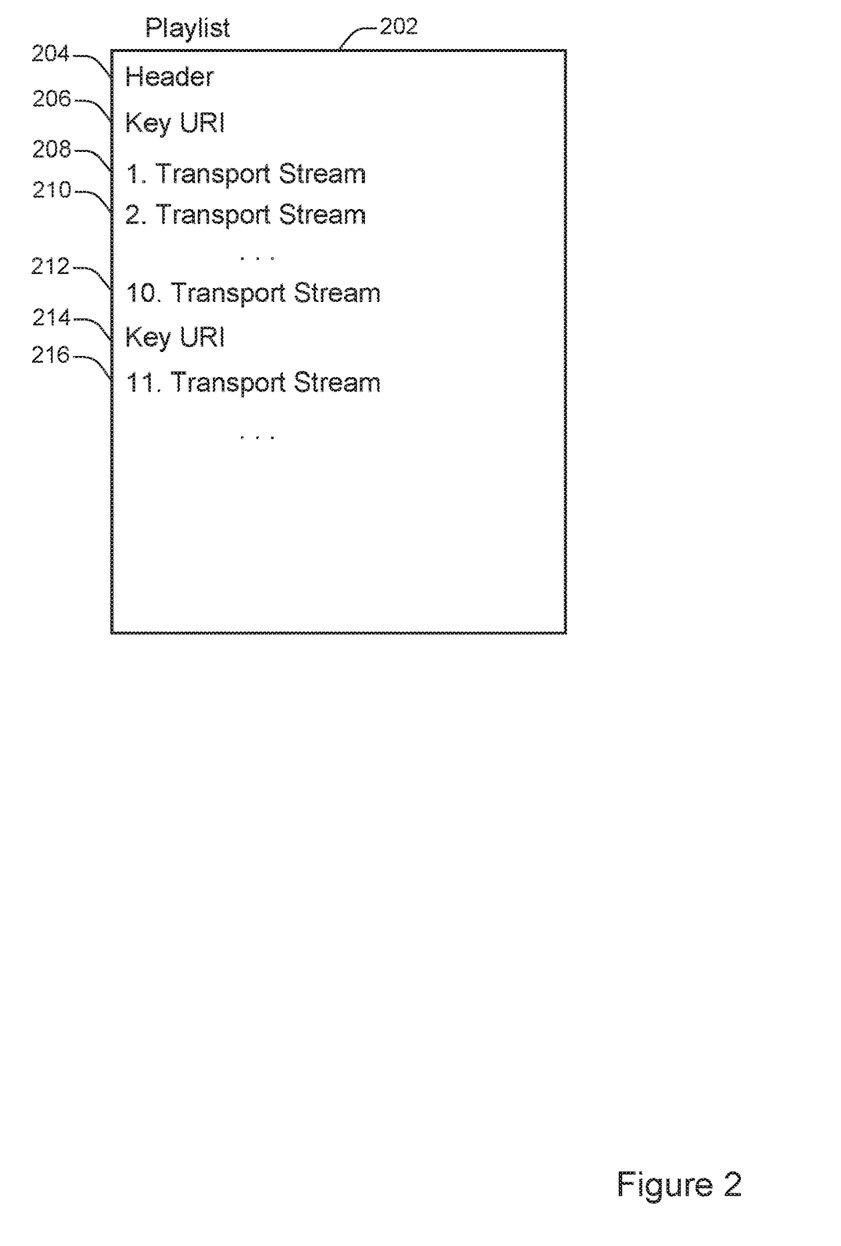
FIG. 2 illustrates one example of a media content playlist.

FIG. 2 illustrates one example of a media content playlist 202. The media content playlist 202 includes a header 204, key URIs 206 and 214, and transport streams 208, 210, 212, and 216. According to various embodiments, the media content playlist 202 may be analyzed by a media player at a client device to determine content to retrieve for presentation.

According to various embodiments, each of the transport streams 208, 210, 212, and 216 may correspond to a media content file or file segment for presentation by the media player. For instance, each transport stream may correspond to some period of time, such as 30 seconds or 2 minutes, of streaming video.

According to various embodiments, a transport stream included in a playlist may provide the media player with information to be used in requesting the associated media content file or file segment. For instance, the transport stream may provide an address for accessing streaming content from a content server or a file identifier associated with a file located in local storage.

According to various embodiments, a key URI such as the key URIs 206 and 214 may indicate to the media player that the media player needs to retrieve a new key to access the upcoming transport streams listed in the playlist. Each key URI may provide an address for retrieving the appropriate key. According to various embodiments, the address may correspond to an address located outside the client machine, such as an address at a key server. Then, when the media player attempts to access this address, the attempt may be intercepted by a media application, as discussed with respect to FIG. 1. Alternately, the address may correspond to an API call for communicating with the media application.

In particular embodiments, one example of a key URI is "mobitvdrm://{SKU}/{key_material}". Another example of a key URI used in various systems is http://{myserver}/{channel}/{key}.html".

According to various embodiments, a key URI may include various types of information. For example, a key URI may include a protocol identifier. The protocol identifier may identify a standard protocol such as HTTP or may identify a custom protocol such as the Mobitvdrm protocol provided by MobiTV located in Emeryville, Calif.

As another example, the key URI may include a server name of a server for retrieving the key. As yet another example, the key URI may include a media content identifier or stock-keeping unit ("SKU") that identifies the media content associated with the requested key.

As still another example, the key URI may include encrypted key material for generating the requested key. The key material may be used by the media player in conjunction with information included in a license received from a license manager to provide the key to the media player.

As a different example, the key URI may identify a channel associated with the requested content and/or an HTML or other web address associated with the requested key.

Figure 3:
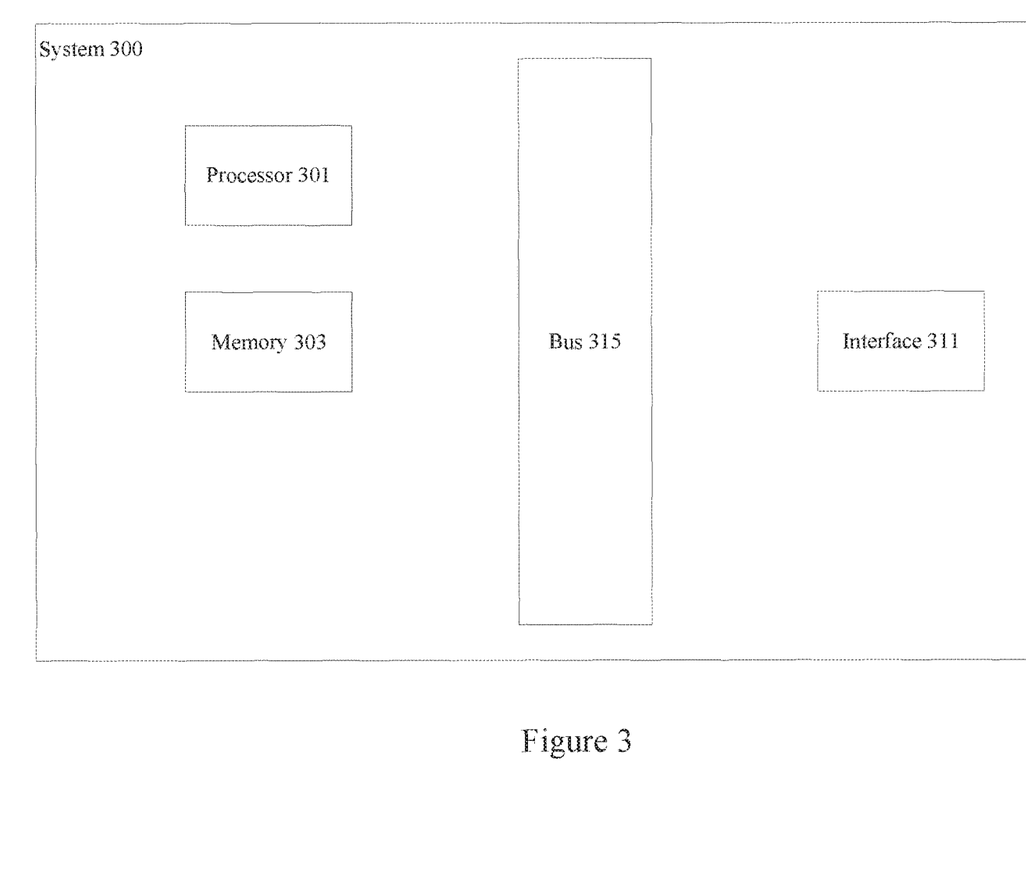
FIGS. 3-5 illustrate examples of systems that can be used with various techniques and mechanisms of the present invention.

FIG. 3 illustrates one example of a computing device. According to particular embodiments, a system 300 suitable for implementing particular embodiments of the present invention includes a processor 301, a memory 303, an interface 311, and a bus 315 (e.g., a PCI bus or other interconnection fabric).

In particular embodiments, the system 300 operates as a client device. When acting under the control of appropriate software or firmware, the processor 301 is responsible for performing various media-related and non-media-related processing tasks. Alternately, the system 300 operates as a streaming server. When acting under the control of appropriate software or firmware, the processor 301 is responsible for modifying and transmitting live media data to a client. Various specially configured devices can also be used in place of a processor 301 or in addition to processor 301. The interface 311 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 300 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

Figure 4:
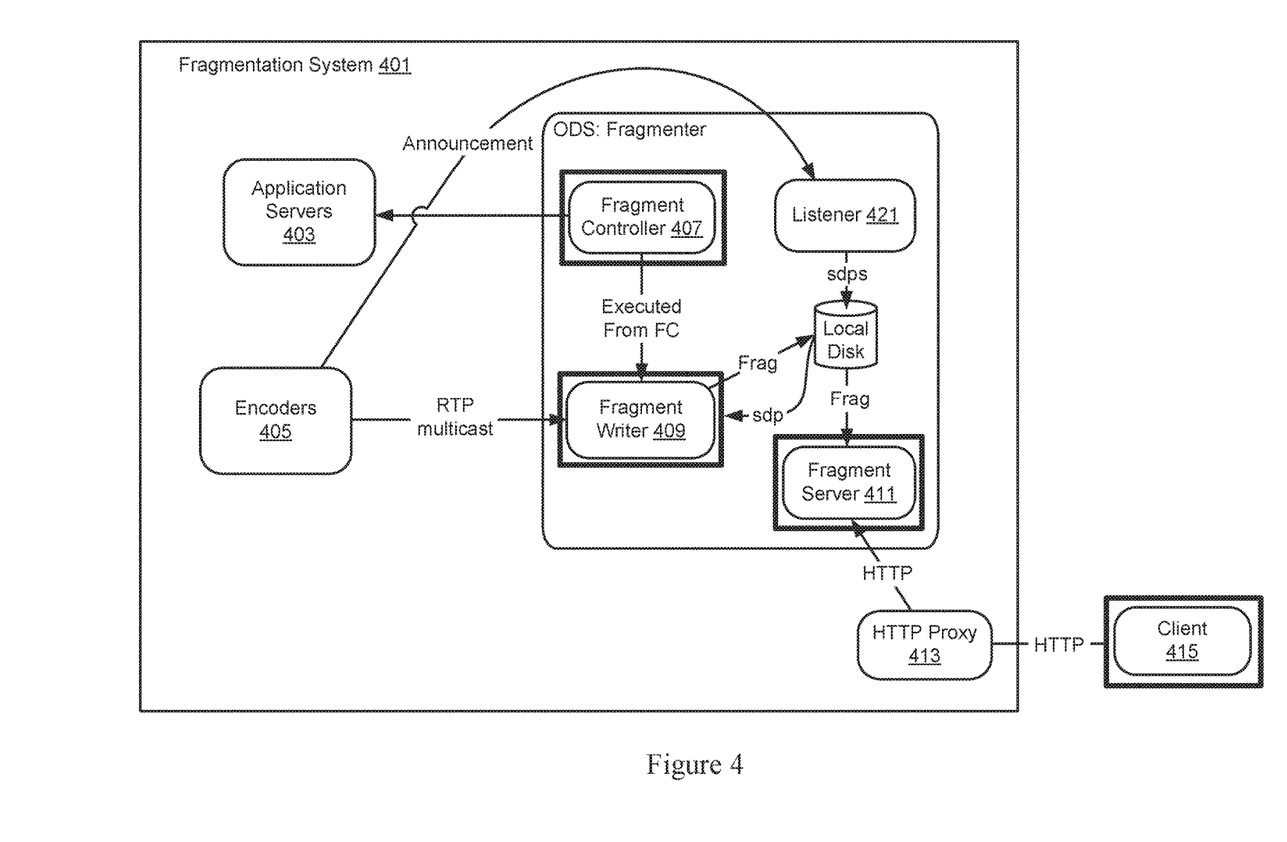

FIG. 4 is a diagrammatic representation illustrating one example of a fragment or segment system 401 associated with a content server that may be used in a broadcast and unicast distribution network. Encoders 405 receive media data from satellite, content libraries, and other content sources and sends RTP multicast data to fragment writer 409. The encoders 405 also send session announcement protocol (SAP) announcements to SAP listener 421. According to various embodiments, the fragment writer 409 creates fragments for live streaming, and writes files to disk for recording. The fragment writer 409 receives RTP multicast streams from the encoders 405 and parses the streams to repackage the audio/video data as part of fragmented MPEG-4 files. When a new program starts, the fragment writer 409 creates a new MPEG-4 file on fragment storage and appends fragments. In particular embodiments, the fragment writer 409 supports live and/or DVR configurations.

The fragment server 411 provides the caching layer with fragments for clients. The design philosophy behind the client/server application programming interface (API) minimizes round trips and reduces complexity as much as possible when it comes to delivery of the media data to the client 415. The fragment server 411 provides live streams and/or DVR configurations.

The fragment controller 407 is connected to application servers 403 and controls the fragmentation of live channel streams. The fragmentation controller 407 optionally integrates guide data to drive the recordings for a global/network DVR. In particular embodiments, the fragment controller 407 embeds logic around the recording to simplify the fragment writer 409 component. According to various embodiments, the fragment controller 407 will run on the same host as the fragment writer 409. In particular embodiments, the fragment controller 407 instantiates instances of the fragment writer 409 and manages high availability.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
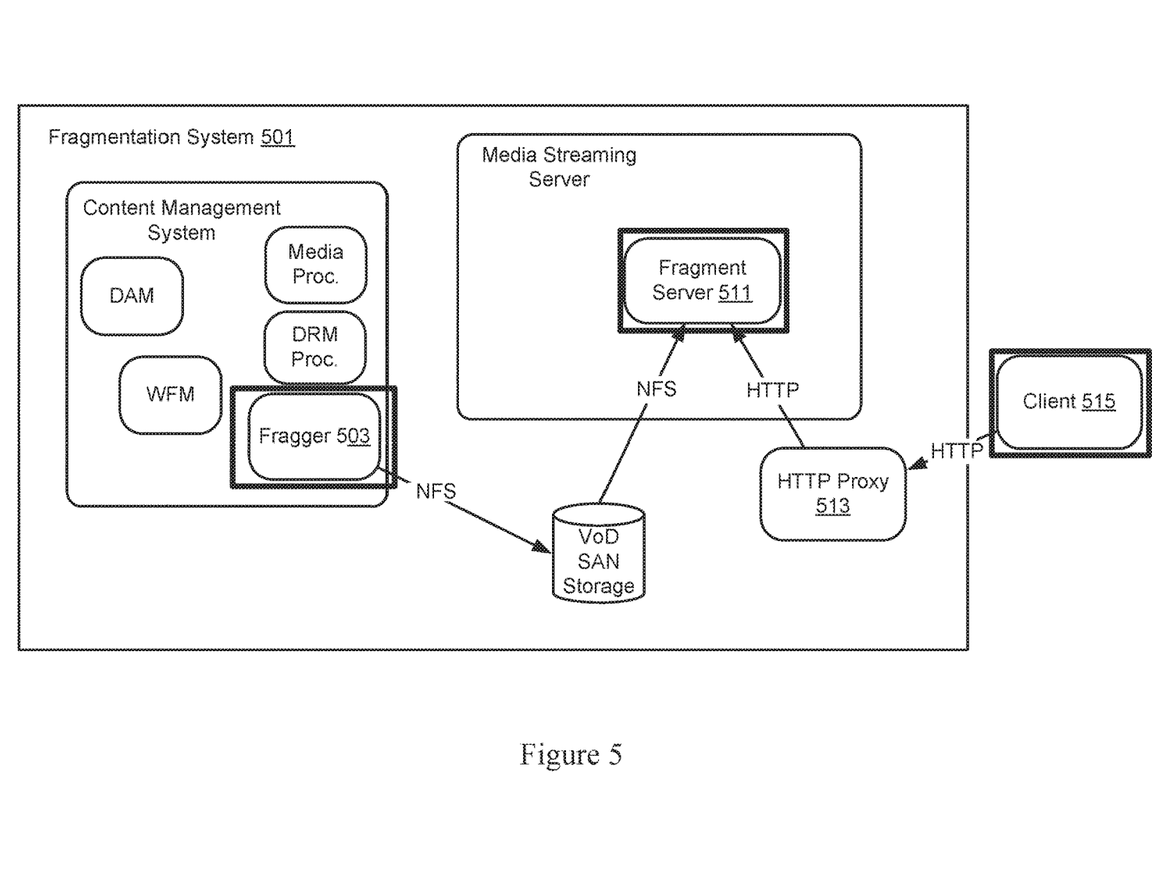

FIG. 5 illustrates one example of a fragmentation system 501 that can be used for video-on-demand (VoD) content. Fragger 506 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 511 provides the caching layer with fragments for clients. The design philosophy behind the client/server API minimizes round trips and reduces complexity as much as possible when it comes to delivery of the media data to the client 515. The fragment server 511 provides VoD content.

According to various embodiments, the client 515 uses a media component that requests fragmented MPEG-4 files, allows trick-play, and manages bandwidth adaptation. The client communicates with the application services associated with HTTP proxy 513 to get guides and present the user with the recorded content available.

Figure 6:
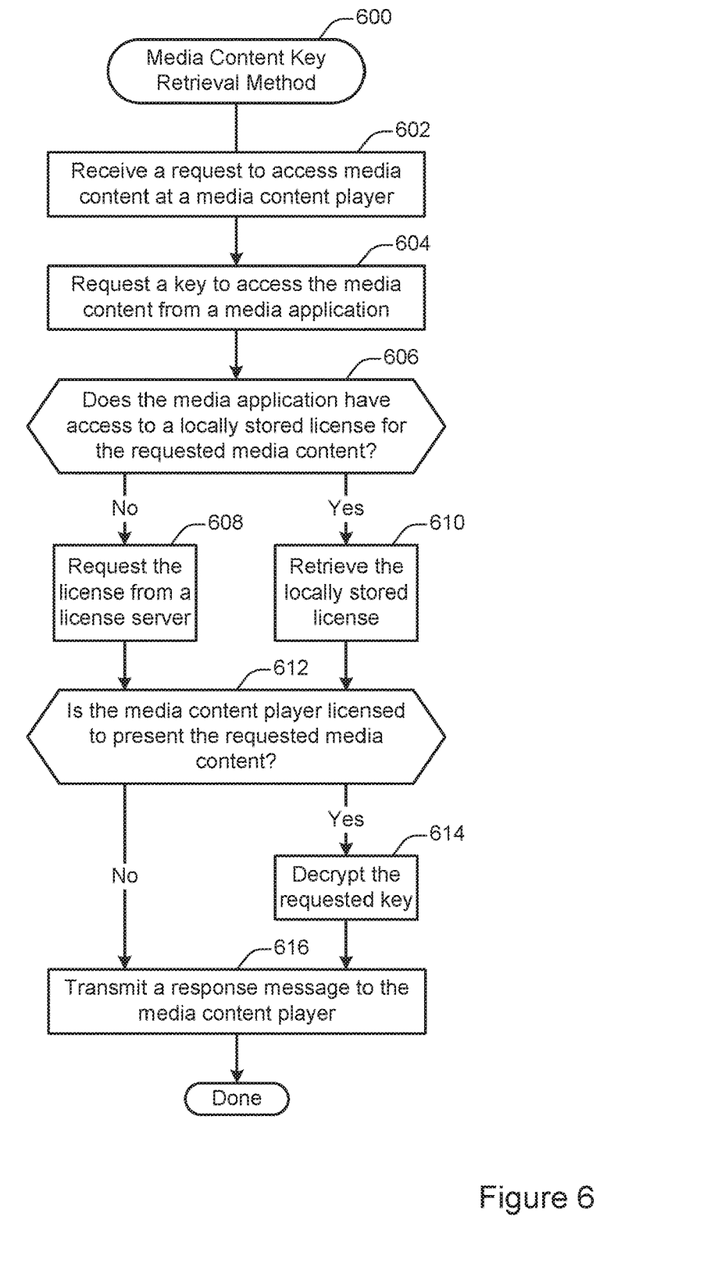
FIG. 6 illustrates an example of a media content key retrieval method.

FIG. 6 illustrates an example of a media content key retrieval method 600. According to various embodiments, the method 600 may be performed at a client machine, such as the client machine discussed with respect to FIG. 1. The client machine may be in communication with one or more servers, as shown in FIG. 1.

According to various embodiments, the method 600 may be initiated when the media content player generates a request to access media content. The method 600 may be used to retrieve a key for accessing media content whenever content is played. For instance, a user may request to view media content such as a streaming movie received from a content server. At this time, the method 600 may be performed to retrieve the key or keys that the media player needs to decrypt the streaming content. Then, the user may again request to view the same media content at a later point in time. Then, the method 600 may be performed again to retrieve the key.

According to various embodiments, performing the method 600 each time a media content item is presented may provide one or more advantages. For example, fine-grained license terms may be enforced. For instance, a user may have permission to access a media content item at one point in time but may not have permission to access the same media content item at a different point in time. As another example, security risks may be reduced. For instance, storing an unencrypted key on a storage device at the client machine may allow a malicious user to gain access to the key. Instead, the key may be retrieved upon each access of the media content item via the method 600.

At 602, a request to access media content at a media content player is received. According to various embodiments, the request may be generated based on user input or may be generated automatically. The request may identify various information about the media content. For instance, the request may identify whether the media content is stored locally or is accessible at a server via a network. The request may also include location information for the media content, such as a local storage location or a remote server address.

At 604, a key to access the media content is requested from a media application. According to various embodiments, the request may include a key URI as discussed with respect to FIG. 1. For instance, a key URI such as "mobitvdrm://{SKU}/{key_material}" may be transmitted from the media player to a DRM agent within the media application. In this URI, "mobitvdrm" is the scheme being used, which is used here to indicate the DRM system. Also, "SKU" in this URI identifies the media content item for which a key is being requested. Finally, "key_material" in this URI provides encrypted information for generating the requested key.

According to various embodiments, at least a portion of the information included in the request generated at operation 604 may be received from an external source. For instance, a user may be browsing a webpage that includes links to streaming media content items. When the user selects one of the links, the media player may attempt to load the selected link. However, instead of requesting the selected link directly, for instance via an HTTP system call, the media player may send all or a portion of the selected link as a request to the media application. For example, in iOS (e.g., versions 4, 5, or 6), the system call may be intercepted using the NSURLProtocol. The media application may thus in some instances replace the web browser as a vehicle for providing access to the requested content.

According to various embodiments, some media content items may be streamed by using a single key. For instance, a media content item may be a single file encrypted with the key or may be a collection of fragments each encrypted with the key. According to various embodiments, some media content items may be streamed by using more than one key. For instance, a media content item or stream may be divided into fragments, at least some of which are encrypted with different keys.

When streaming media content items, the request to access the media content item may include information identifying the media content item key, such as a SKU or other identifier. In some cases, a license may include more than one key, so the request may include one or more key identifiers for looking up the license associated with the media content item. Alternately, or additionally, the request may include an encrypted traffic encryption key (TEK).

Then, the DRM agent located in the application at the client machine may use its license to decrypt the encrypted key and return this to the native players for playback.

According to various embodiments, some media content items may be stored on a local storage medium and accessed locally. When playing back locally stored and encrypted content with a native media content player, a file may be provided in HLS format or another native format. A concatenated Transport Stream (TS) file, or correspondingly, a multi-fragment ISO base media file (MPEG4 part 12), may be provided to simplify the client storage of the media content file. Alternately, a media content item may be divided into multiple segments stored as separate files. In particular embodiments, a client device may use a local web server to provide access to the local content and may then use a mechanism whereby the keys are passed through the key URIs to allow playback.

At 606, a determination is made as to whether the media application has access to a locally stored license for the requested media content item. According to various embodiments, the determination may be made at least in part by sending a query to a directory of the contents of a license repository accessible to the media application. An example of a license repository is the license repository 118 discussed with respect to FIG. 1.

At 608, when the media application does not have access to a locally stored license for the requested media content, the license is requested from a license server. According to various embodiments, various types of secure communications techniques may be used to request and receive the license from the license server. For instance, the communications may be conducted at least in part via public key encryption, where each device has a public key and a private key.

According to various embodiments, the request may include authentication or identification information for allowing the license server to determine whether the client machine is authorized to receive a license for the content and what the terms of that license should be. For instance, the request may identify a user of the client machine as being associated with a designated content management account that provides the user with various types of access rights to media content items.

According to various embodiments, the license received from the license server may be stored in a license repository, such as the license repository 118 discussed with respect to FIG. 1. The license repository may maintain one or more licenses for subsequent access by the DRM agent 116.

At 610, when the media application has access to a locally stored license for the requested media content, the locally stored license is retrieved. As discussed with respect to the local storage system 112 shown in FIG. 1, licenses may be stored in a system accessible to the media application to reduce the amount of communication conducted between the media application and the licensing server. The local storage system 112 may be implemented using a storage device such as a hard disk or a memory module located at the client device.

At 612, a determination is made as to whether the media content player is licensed to present the requested media content. According to various embodiments, the determination may be made by analyzing one or more conditions or constraints included in the license received from the license server. For example, the license may allow the media content to be played a maximum number of times, such as five. Then, the media application may track the number of times that it has provided the requested key to the media player and determine whether that number has reached the maximum. As another example, the license may allow the media content to be played only during a designated time period or until a designated point in time is reached.

At 614, the requested key is decrypted. According to various embodiments, decrypting the requested key may include using information received from the license server. For example, the requested key may be included in the license received from the license server. In particular embodiments, information included in the license may be combined with other information, such as encrypted key material included with the request received from the media content player at operation 602. For example, the license may include a different key or instructions for use in decrypting the key material.

At 616, a response message is transmitted to the media content player. According to various embodiments, the content of the response message may depend on the outcome of the determination made at operation 612. If the media player is licensed to present the requested media content, then the response message may include the requested key decrypted at operation 614. If instead the media player is not licensed to present the requested media content, then the response message may include an indication that playback is not permitted.

Figure 7:
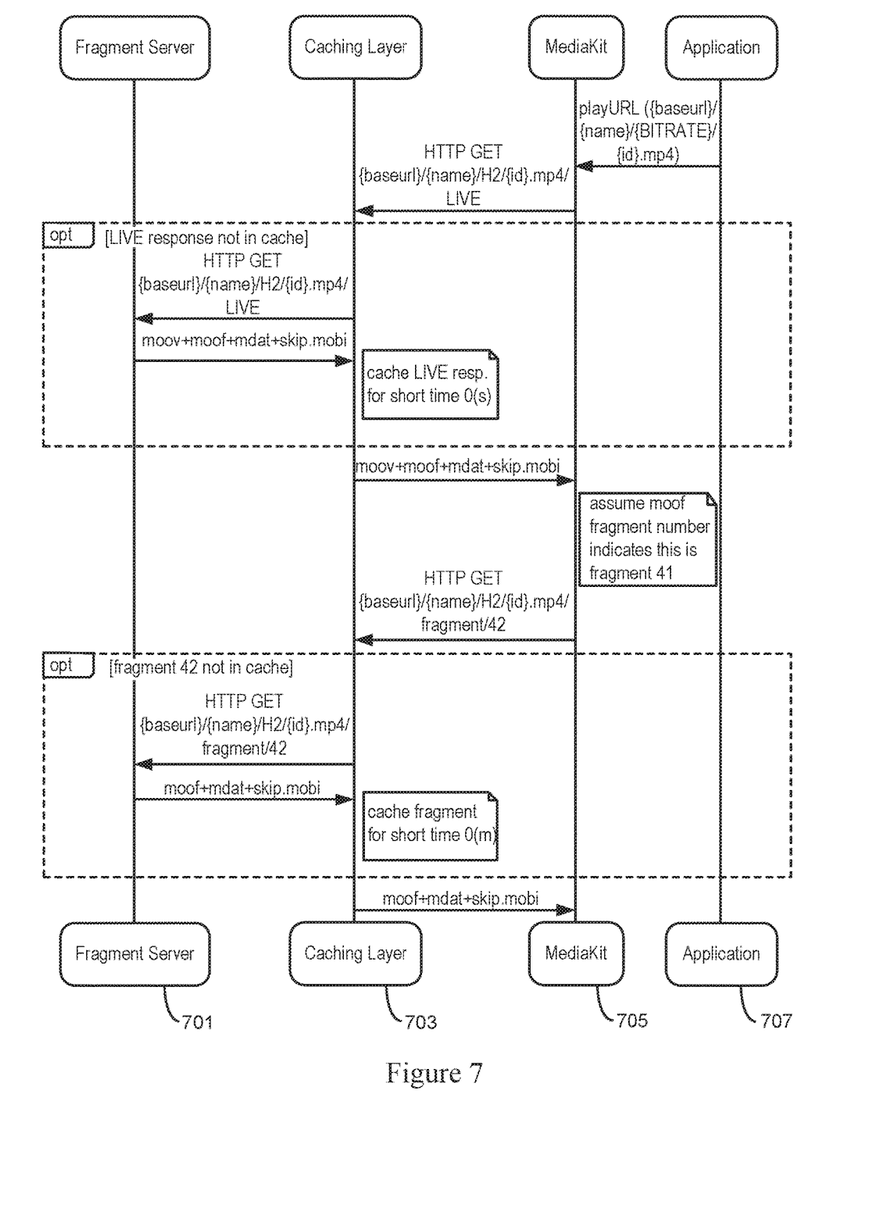
FIG. 7 illustrates one example of an exchange used with a media delivery system.

FIG. 7 illustrates an interaction for a client receiving a media stream such as a live stream. The client starts playback when fragment 41 plays out from the server. The client uses the fragment number so that it can request the appropriate subsequent file fragment. An application such as a player application 707 sends a request to mediakit 705. The request may include a base address and bit rate. The mediakit 705 sends an HTTP get request to caching layer 703. According to various embodiments, the live response is not in cache, and the caching layer 703 forwards the HTTP get request to a fragment server 701. The fragment server 701 performs processing and sends the appropriate fragment to the caching layer 703 which forwards to the data to mediakit 705.

The fragment may be cached for a short period of time at caching layer 703. The mediakit 705 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 705 may request a next fragment having a different data rate. In some instances, the mediakit 705 may request a next fragment having a higher data rate. According to various embodiments, the fragment server 701 maintains fragments for different quality of service streams with timing synchronization information to allow for timing accurate playback.

The mediakit 705 requests a next fragment using information from the received fragment. According to various embodiments, the next fragment for the media stream may be maintained on a different server, may have a different bit rate, or may require different authorization. Caching layer 703 determines that the next fragment is not in cache and forwards the request to fragment server 701. The fragment server 701 sends the fragment to caching layer 703 and the fragment is cached for a short period of time. The fragment is then sent to mediakit 705.

Figure 8:
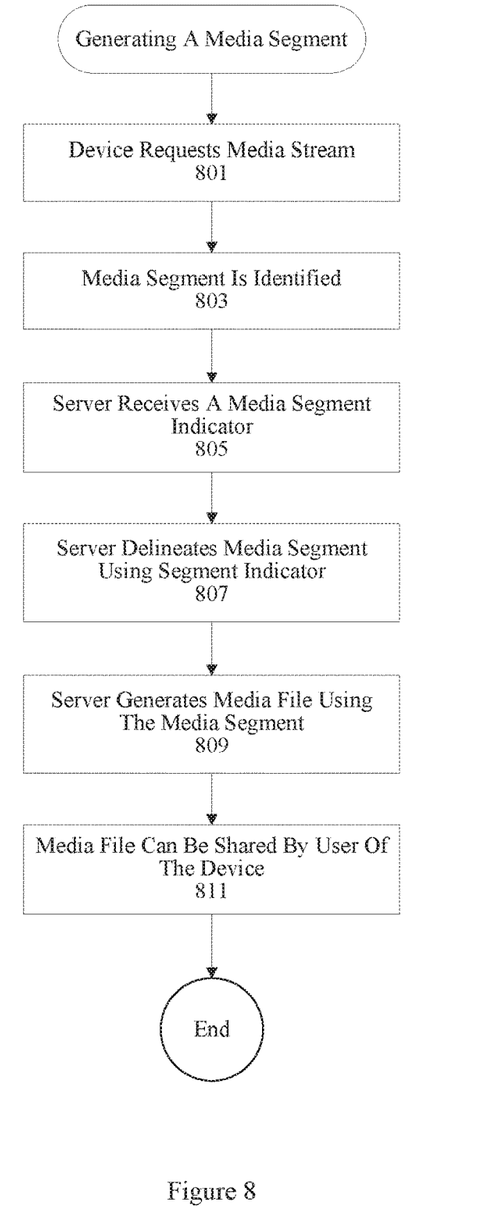
FIG. 8 illustrates one technique for generating a media segment.

FIG. 8 illustrates a particular example of a technique for generating a media segment. According to various embodiments, a media stream is requested by a device at 801. The media stream may be a live stream, media clip, media file, etc. The request for the media stream may be an HTTP GET request with a baseurl, bit rate, and file name. At 803, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 805, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 807. The media stream may only be available in a channel buffer. At 809, the server generates a media file using the media segment maintained in cache. The media file can then be shared by a user of the device at 811. In some examples, the media file itself is shared while in other examples, a link to the media file is shared.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
transmitting a request for a content decryption key from a first media component at a mobile computing device to a license server in accordance with a designated key exchange protocol;
receiving a license for an encrypted media content item at the first media component, the encrypted media content item corresponding with the requested content decryption key, the license being specific to a designated user account;
generating the requested content decryption key by decrypting encrypted key material via a processor at the mobile computing device based on information included in the license, the encrypted key material being included in a key request uniform resource identifier ("URI"), wherein the key request URI is included in the request for the content decryption key; and
providing the requested content decryption key to a second media component at the mobile computing device for media playback, the requested content decryption key configured to be used by the second media component to decrypt the encrypted media content item, the requested content decryption key being provided in accordance with a designated key exchange protocol.

2. The method recited in claim 1, wherein the key request URI includes a custom digital rights management ("DRM") protocol identifier, and wherein the designated key exchange protocol corresponds with the custom DRM protocol identifier.

3. The method recited in claim 1, wherein the second media component comprises a media player native to an operating system of the mobile computing device.

4. The method recited in claim 3, wherein the first media component and the second media component are operable to communicate via an application programming interface (API) native to an operating system of the mobile computing device.

5. The method recited in claim 1, the method further comprising:
determining whether the request for the content decryption key satisfies one or more usage conditions specified by the license.

6. The method recited in claim 1, the method further comprising:
determining whether the license is stored on a storage medium local to the mobile computing device.

7. The method recited in claim 6, the method further comprising:
storing the license on the storage medium when it is determined that the license is not stored on the storage medium local to the mobile computing device.

8. The method recited in claim 1, wherein the request for the content decryption key identifies a content management account associated with the license server.

9. The method recited in claim 1, wherein the encrypted media content item comprises streaming media content received at the mobile computing device via a network.

10. The method recited in claim 1, wherein the encrypted media content item includes at least one file stored on a storage medium local to the mobile computing device.

11. A mobile computing device comprising:
a communications interface operable to transmit a request for a content decryption key from a first media component at a mobile computing device to a license server in accordance with a designated key exchange protocol and to receive a license for an encrypted media content item at the first media component, the encrypted media content item corresponding with the requested content decryption key, the license being specific to a designated user account;
a storage device operable to store the requested content decryption key generated by decrypting encrypted key material via a processor at the mobile computing device based on information included in the license, the encrypted key material being included in a key request uniform resource identifier ("URI"), wherein the key request URI is included in the request for the content decryption key; and
a processor operable to provide the requested content decryption key to a second media component at the mobile computing device for media playback, the requested content decryption key configured to be used by the second media component to decrypt the encrypted media content item, the requested content decryption key being provided in accordance with a designated key exchange protocol.

12. The mobile computing device recited in claim 11, wherein the key request URI includes a custom digital rights management ("DRM") protocol identifier, and wherein the designated key exchange protocol corresponds with the custom DRM protocol identifier.

13. The mobile computing device recited in claim 11, wherein the second media component comprises a media player native to an operating system of the mobile computing device.

14. The mobile computing device recited in claim 13, wherein the first media component and the second media component are operable to communicate via an application programming interface (API) native to an operating system of the mobile computing device.

15. The mobile computing device recited in claim 11, wherein the request for the content decryption key identifies a content management account associated with the license server.

16. The mobile computing device recited in claim 11, wherein the encrypted media content item comprises streaming media content received at the mobile computing device via a network.

17. The mobile computing device recited in claim 11, wherein the encrypted media content item includes at least one file stored on a storage medium local to the mobile computing device.

18. One or more non-transitory computer readable media having instructions stored thereon for performing a method, the method comprising:

> transmitting a request for a content decryption key from a first media component at a mobile computing device to a license server in accordance with a designated key exchange protocol;
>
> receiving a license for an encrypted media content item at the first media component, the encrypted media content item corresponding with the requested content decryption key, the license being specific to a designated user account;
>
> generating the requested content decryption key by decrypting encrypted key material via a processor at the mobile computing device based on information included in the license, the encrypted key material being included in a key request uniform resource identifier ("URI"), wherein the key request URI is included in the request for the content decryption key; and
>
> providing the requested content decryption key to a second media component at the mobile computing device for media playback, the requested content decryption key configured to be used by the second media component to decrypt the encrypted media content item, the requested content decryption key being provided in accordance with a designated key exchange protocol.

19. The one or more computer readable media recited in claim 18, wherein the key request URI includes a custom digital rights management ("DRM") protocol identifier, and wherein the designated key exchange protocol corresponds with the custom DRM protocol identifier.

20. The one or more computer readable media recited in claim 18, wherein the second media component comprises a media player native to an operating system of the mobile computing device.

* * * * *